(12) United States Patent
Li (10) Patent No.: US 10,929,710 B2
(45) Date of Patent: Feb. 23, 2021

(54) METHODS AND DEVICES FOR QUANTIFYING TEXT SIMILARITY

(71) Applicant: Advanced New Technologies Co., Ltd., Grand Cayman (KY)

(72) Inventor: Ruoyu Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/791,858

(22) Filed: Feb. 14, 2020

(65) Prior Publication Data

US 2020/0372293 A1 Nov. 26, 2020

(30) Foreign Application Priority Data

May 21, 2019 (SG) .............................. 10201904554T (51) Int. Cl.
*G06K 9/62* (2006.01)
*G06K 9/03* (2006.01)
*G06F 16/2455* (2019.01)

(52) U.S. Cl.
CPC ..... *G06K 9/6215* (2013.01); *G06F 16/24558* (2019.01); *G06K 9/03* (2013.01); *G06K 2209/01* (2013.01)

(58) Field of Classification Search
CPC .... G06K 9/6215; G06K 9/03; G06K 2209/01; G06F 16/24558
See application file for complete search history.

(56) References Cited

U.S. PATENT DOCUMENTS

| 9,727,804 B1* | 8/2017 | Lapointe ............ G06Q 30/0206 |
| 2010/0074509 A1 | 3/2010 | Laaser et al. |
| 2017/0046668 A1 | 2/2017 | Rowley et al. |

FOREIGN PATENT DOCUMENTS

| CN | 106033416 | 10/2016 |
| CN | 106250364 | 12/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Pinalben Patel
(74) *Attorney, Agent, or Firm* — Fish & Richardson P.C.

(57) ABSTRACT

Disclosed herein are computer-implemented methods; computer-implemented systems; and non-transitory, computer-readable media, for quantifying text similarity. One computer-implemented method includes obtaining a plurality of shortest operation paths including one or more edit pairs for correcting an optical correction recognition (OCR) text string with an edit text string, where each of the one or more edit pairs denotes an operation performable to a character of the OCR text string during correction by the edit text string. A plurality of similarity scores is determined, each corresponding to one of the plurality of shortest operation paths and determined by summing historical similarity scores of the one or more edit pairs of each of the plurality of shortest operation paths. A minimum one of the plurality of similarity scores is selected to quantify text similarity between the OCR text string and the edit text string.

18 Claims, 8 Drawing Sheets

(56) References Cited

OTHER PUBLICATIONS

Nakamoto, "Bitcoin: A Peer-to-Peer Electronic Cash System," www.bitcoin.org, 2005, 9 pages.
Pettersson, et al., "Normalisation of historical text using context-sensitive weighted Levenshtein distance and compound splitting," Proceedings of the 19th Nordic Conference of Computational Linguistics (NODALIDA 2013), Oslo, Norway, May 24, 2013, pp. 163-179.

* cited by examiner

| # | # | A | z | a | h | a |
|---|---|---|---|---|---|---|
| A | 0 | 1 | 2 | 3 | 4 | 5 |
| z | 1 | 0 | 1 | 2 | 3 | 4 |
| i | 2 | 1 | 0 | 1 | 2 | 3 |
| z | 3 | 2 | 1 | 2 | 2 | 3 |
|   | 4 | 3 | 2 | 2 | 2 | 3 |

Figure 4

| "Azaha" --> "Aziz" | Operation 1 | Operation 2 | Operation 3 | Similarity Score |
|---|---|---|---|---|
| Shortest Operation Path 1 | Substitute character "a" with character "i", which is denoted by an edit pair ("a", "i") | Substitute character "h" with character "z", which is denoted by an edit pair ("h", "z") | Delete character "a", which is denoted by an edit pair ("a", " ") | Summation of: Historical Similarity Score of ("a", "i") + Historical Similarity Score of ("h", "z") + Historical Similarity Score of ("a", " "). For example, 0.5 + 0.8 + 0.6 = 1.9 |
| Shortest Operation Path 2 | Delete character "a", which is denoted by an edit pair ("a", " ") | Substitute character "h" with character "i", which is denoted by an edit pair ("h", "i") | Substitute character "a" with character "z", which is denoted by an edit pair ("a", "z") | Summation of: Historical Similarity Score of ("a", " ") + Historical Similarity Score of ("h", "i") + Historical Similarity Score of ("a", "z"). For example, 0.6 + 0.4 + 0.4 = 1.4 |
| Shortest Operation Path 3 | Substitute character "a" with character "i", which is denoted by an edit pair ("a", "i") | Delete character "h", which is denoted by an edit pair ("h", " ") | Substitute character "a" with character "z", which is denoted by an edit pair ("a", "z") | Summation of: Historical Similarity Score of ("a", "i") + Historical Similarity Score of ("h", " ") + Historical Similarity Score of ("a", "z"). For example, 0.5 + 0.6 + 0.4 = 1.5 |

Figure 5

| Edit pair | Historical similarity score |
|---|---|
| ("a", "") | 0.6 |
| ("a", "i") | 0.5 |
| ("a", "z") | 0.4 |
| ("h", "") | 0.6 |
| ("h", "i") | 0.4 |
| ("h", "z") | 0.8 |
| ... | ... |

METHODS AND DEVICES FOR QUANTIFYING TEXT SIMILARITY

CROSS-REFERENCE TO RELATED APPLICATIONS

This application claims priority to Singapore Patent Application No. 10201904554T, filed on May 21, 2019, which is hereby incorporated by reference in its entirety.

FIELD OF INVENTION

The present invention relates broadly, but not exclusively, to methods and devices for quantifying text similarity.

BACKGROUND

Optical character recognition, often abbreviated as OCR, is a technique to recognise texts in images or physical documents and convert them into machine-encoded texts. The machine-encoded texts are often referred to as OCR texts.

Electronic-Know Your Customer (eKYC) is a digital due diligence process performed by a business to verify the identity of its clients and to assess potential risks of illegal intentions towards the business relationship (e.g. money laundering).

When performing eKYC, OCR may be used to recognise textual contents, e.g. names, addresses, identification numbers, etc. in official identity (ID) documents, e.g. ID card, passport etc. Often, the OCR texts are shown on user interface for users to confirm or edit. If the users correct the OCR texts with edit texts, it will be necessary to verify whether the edit texts are reasonable, as a gesture of risk control, before the correction is accepted. It thus becomes useful to evaluate similarity between the OCR texts and the user edit texts so as to verify whether the edit texts are reasonable.

Currently, Edit Distance technique and Jaccard Distance technique are used to evaluate similarity between two text strings. However, the Edit Distance technique evaluates similarity based on the minimum number of operations required to transform one text string into the other, but ignores visual similarity between the two text strings; on the other hand, the Jaccard Distance technique ignores both visual similarity and the order of the characters in the two text strings.

Examples of how similarity between 2 text strings is evaluated in accordance with Edit Distance technique are shown in Table 1 below.

TABLE 1

| Example | Text String A → Text String B | Edit Distance |
| --- | --- | --- |
| 1 | BOB → BOB | 1 |
| 2 | BOB → 1OB | 1 |

As shown in Table 1, in Edit Distance technique, edit distance is used to indicate the minimum number of operations required to transform Text String A to Text String B. In Example 1, it requires one operation of substituting the number "0" with the letter "O" in order to transform "B0B" to "BOB". In Example 2, it requires one operation of substituting the letter "B" with the number "1" in order to transform "BOB" to "1OB". The edit distances in Examples 1 and 2 are the same, i.e. each equals 1. As such, the similarity between "B0B" and "BOB" and the similarity between "BOB" and "1OB" are considered the same in Edit Distance technique. Such a similarity evaluation only considers the minimum number of operations but ignores visual similarity between the pair of characters in each operation, inaccurately treating "0" and "O" versus "B" and "1" to be equally similar.

A need therefore exists to provide methods and devices that provide a holistic and comprehensive mechanism to improve text similarity evaluation by evaluating not only the minimum number of operations required to transform one text string into the other but also relevance between two text strings, i.e. how likely those operations may happen between the two text strings.

By virtue of the improved text similarity evaluation mechanism, the methods and devices in the present disclosure are configured to not only evaluate (i.e. to determine "whether similar") but also quantify (i.e. to determine "how similar") text similarities between two text strings, which facilitate eKYC systems and any other electronic systems that deploy OCR techniques to function with an enhanced accuracy and reliability on auto-verification of manual corrections to OCR texts.

SUMMARY

According to a first embodiment, there is provided a device for quantifying text similarity, the device comprising: a processor; and a memory including computer program code. The memory and the computer program code are configured to, with the processor, cause the device at least to: obtain a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string; determine a plurality of similarity scores, each of the plurality of similarity scores corresponding to one of the plurality of shortest operation paths, wherein each of the plurality of similarity scores is determined by summing historical similarity scores of the one or more edit pairs of each of the plurality of shortest operation paths; and select a minimum one of the plurality of similarity scores to quantify text similarity between the OCR text string and the edit text string.

According to a second embodiment, there is provided a computer-implemented method for quantifying text similarity, comprising: obtaining a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string; determining a plurality of similarity scores for the plurality of shortest operation paths, wherein each of the plurality of similarity scores is determined by summing historical similarity scores of the one or more edit pairs of each of the plurality of shortest operation paths; and selecting a minimum one of the plurality of similarity scores to quantify text similarity between the OCR text string and the edit text string.

According to a third embodiment, there is provided system for quantifying text similarity, comprising: an OCR device configured to capture an OCR text string from a digital image; an input device configured to capture a user edit string; a device for quantifying text similarity configured to: obtain a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string; determine a plurality of similarity scores for the plurality of shortest operation paths, wherein each of the plurality of similarity scores is determined by summing historical similarity scores of the one or more edit pairs of each of the plurality of shortest operation paths; and select a minimum one of the plurality of similarity scores to quantify text similarity between the OCR text string and the edit text string; and an output device configured to output a text similarity quantification result.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "denoting", "determining", "selecting", "retrieving", "calculating", "collecting", "performing", "normalising", "adding", "updating", "correcting", "maintaining", "outputting", "capturing", "receiving" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below. In the present specification, the terms "device" and "module" are interchangeably used to refer to the apparatuses that perform the operations of the methods.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Embodiments of the present disclosure provide a data-driven approach that utilises frequencies of operations from history data to better evaluate and quantify text similarity between two text strings.

The operations include insertion operations, deletion operations and/or substitution operations that are performable to characters of a first text string for correcting the first text string with a second text string. The characters include numbers, letters, symbols, etc. In the context of OCR, the first text string includes an OCR text string recognised from textual content of an image or a physical document. The OCR text string can be a name, an address, a date of birth, an identification number, etc. The second text string includes a user edit string that a user attempts to correct the OCR text string with.

In various embodiments of the present disclosure, edit pairs are used to denote the above mentioned operations. For example, an edit pair (" ", "a") denotes an operation of inserting a character "a"; an edit pair ("a", "a") denotes an operation of deleting the character "a"; and an edit pair ("a", "b") denotes an operation of substituting the character "a" with a character "b".

Figure 1:
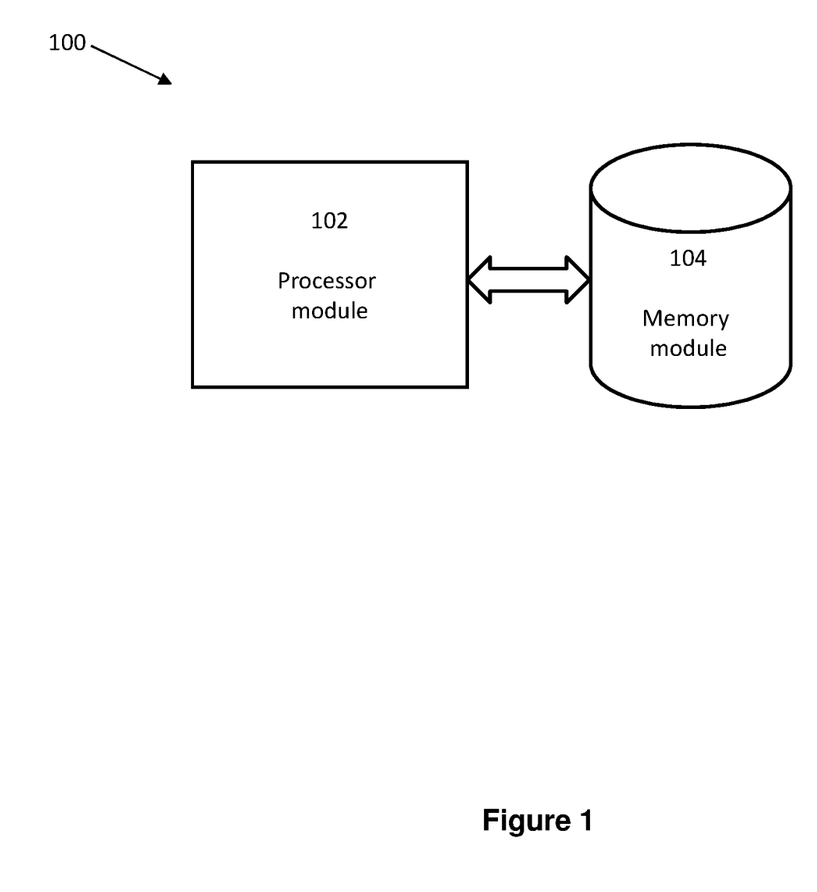
FIG. 1 is a schematic diagram of a device for quantifying text similarity, according to an embodiment.

FIG. 1 illustrates a schematic diagram of a device 100 for quantifying text similarity according to an embodiment of the present disclosure. The device 100 at least includes a processor module 102 and a memory module 104. The processor module 102 and the memory module 104 are interconnected. The memory module 104 includes computer program code (not shown in FIG. 1). The memory module 104 and the computer program code are configured to, with the processor module 102, cause the device 100 to perform the steps for quantifying text similarity as described in the present disclosure. Details of the steps will be described below with reference to FIG. 3, which depicts a flow chart illustrating a method 300 for quantifying text similarity according to an embodiment.

Figure 2:
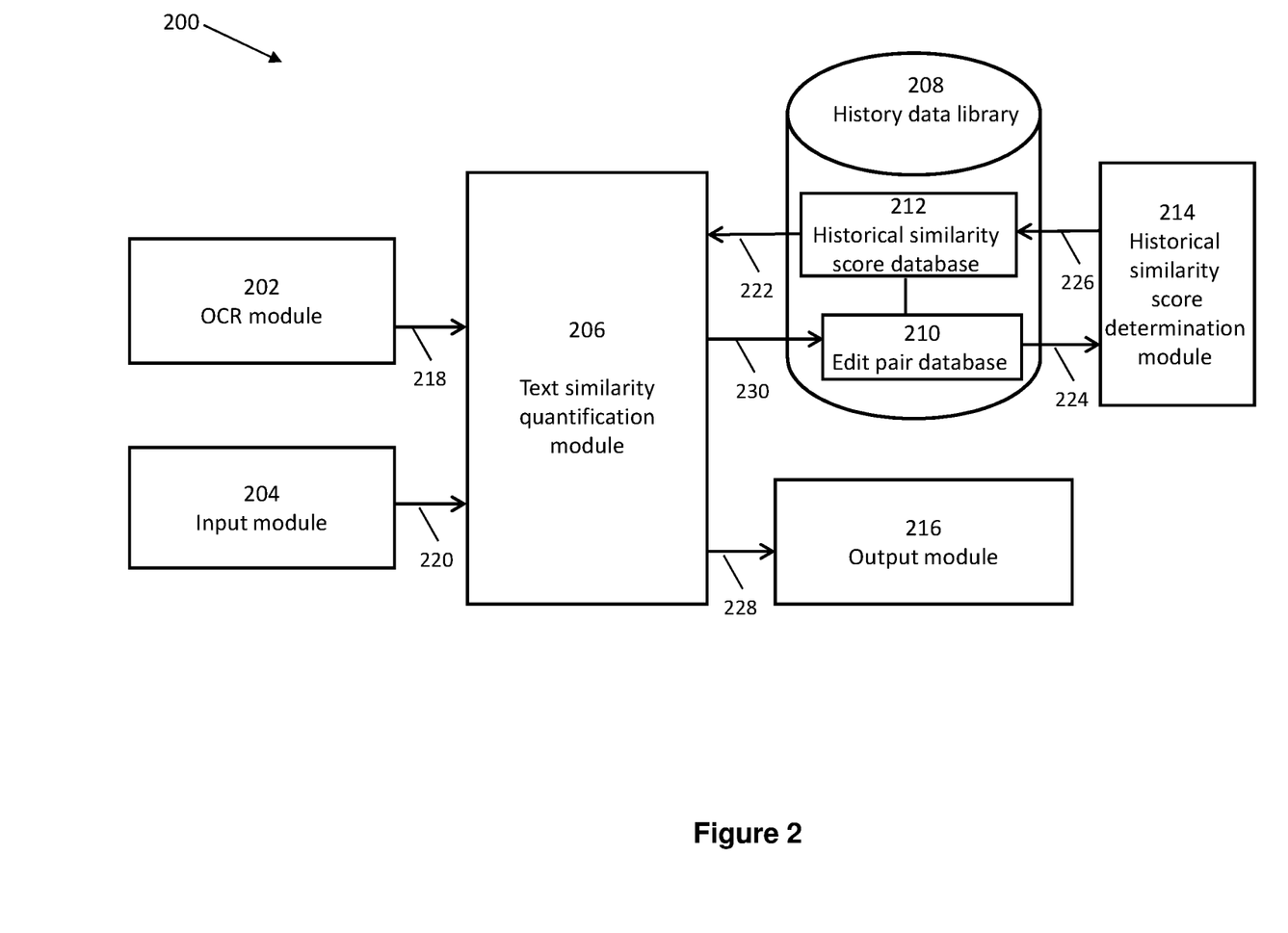
FIG. 2 is a schematic diagram of a system for quantifying text similarity, according to an embodiment.

The device 100 for quantifying text similarity can be implemented as a text similarity quantification module 206 in an exemplified system 200 for quantifying text similarity as shown in FIG. 2, in accordance with an embodiment.

As shown in FIG. 2, in addition to the text similarity quantification module 206, the system 200 can include an OCR module 202, an input module 204, a history data library 208, a historical similarity score determination module 214, and an output module 216.

The OCR module 202 may include an acquisition module and an image conversion module, both of which are not shown in FIG. 2. The acquisition module may be in the form of an optical scanner that is configured to obtain a digital image of a physical document. The image conversion module, together with suitable OCR software, can be configured to convert at least a portion of textual content of the digital image of the physical document into corresponding machine-readable text (or code). The machine-readable texts (or codes) are interchangeably referred to as OCR text strings in the present disclosure. In this manner, the OCR text strings are captured by the OCR module 202.

The input module 204 may include a keyboard, a mouse, a stylus, a voice recognition user interface, etc. that captures input from users. When the OCR text strings being displayed to the output module 216 for users to confirm or edit, the users can use the input module 204 to confirm the OCR text strings. If the users use the input module 204 to correct the OCR text strings with edit text strings, the edit text strings can be captured by the input module 204.

In some embodiments, when the edit text strings are captured by the input module 204, the system can instruct (not shown in FIG. 2 for the sake of simplicity) the OCR module 202 and the input module 204 to transmit the OCR text strings and the edit text strings to the text similarity quantification module 206, respectively.

The text similarity quantification module 206 can receive 218 the OCR text strings from the OCR module 202 and receive 220 the edit text strings from the input module 204, and quantify text similarities between the OCR text strings and the edit text strings in accordance with the methods of the present disclosure. When quantifying text similarities between the OCR text strings and the edit text strings in accordance with the methods of the present disclosure, the text similarity quantification module 206 may communicate 222 with the history data library 208 to retrieve historical similarity scores of certain edit pairs required for the quantification of text similarity.

Figure 3:
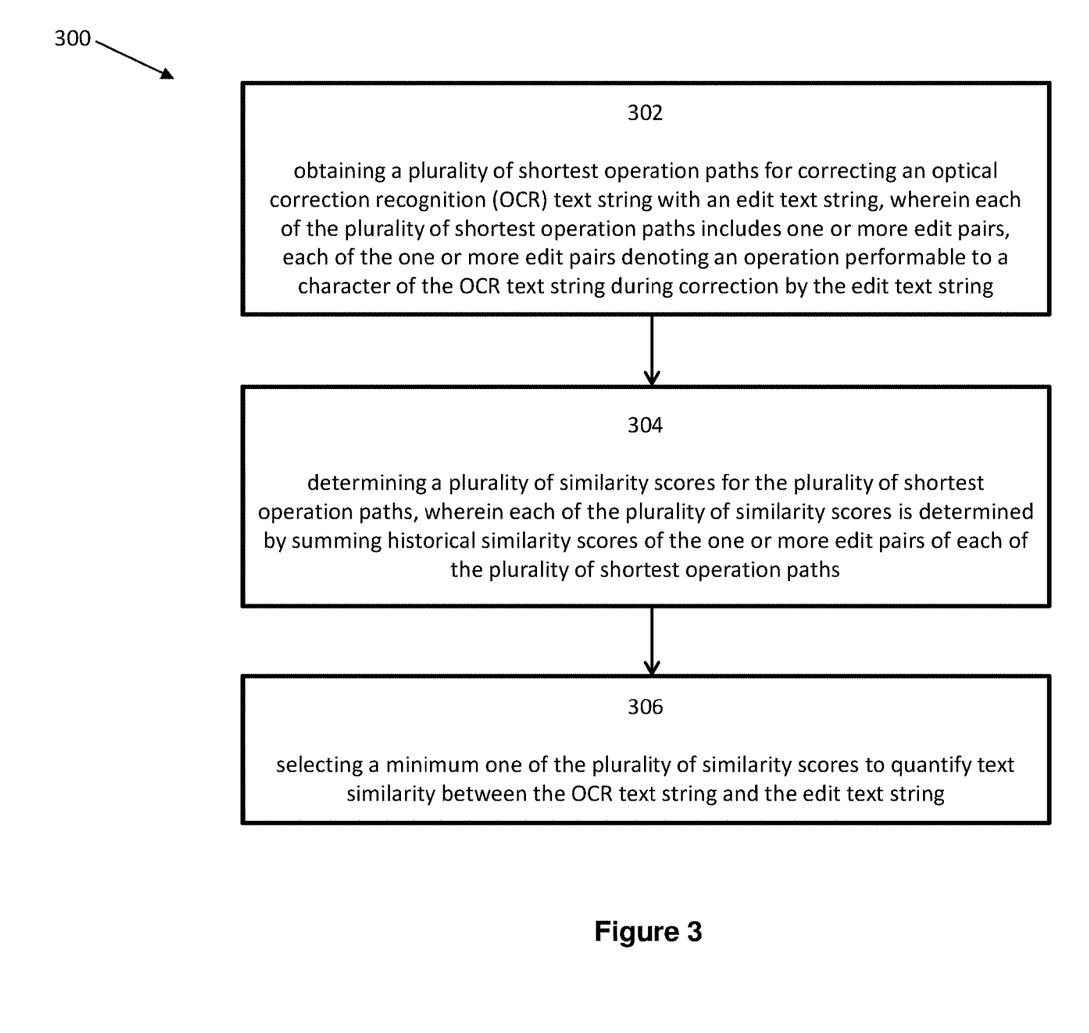
FIG. 3 is a flow chart illustrating a method for quantifying text similarity, according to an embodiment.

Examples of the methods for the text similarity quantification module 206 quantifying text similarities between the OCR text strings and the edit text strings are depicted in FIGS. 3 to 6. As shown in FIG. 3, when quantifying text similarity between an OCR text string and an edit text string, the text similarity quantification module 206 is configured at least to perform the following steps:

302: obtain a plurality of shortest operation paths for correcting the OCR text string with the edit text string, wherein each of the plurality of shortest operation paths includes one or more edit pairs, each of the one or more edit pairs denoting an operation performable to a character of the OCR text string during correction by the edit text string;

304: determine a plurality of similarity scores, each of the plurality of similarity scores corresponding to one of the plurality of shortest operation paths, wherein each of the plurality of similarity scores is determined by summing historical similarity scores of the one or more edit pairs of each of the plurality of shortest operation paths; and 306: select a minimum one of the plurality of similarity scores to quantify text similarity between the OCR text string and the edit text string.

Figure 4:
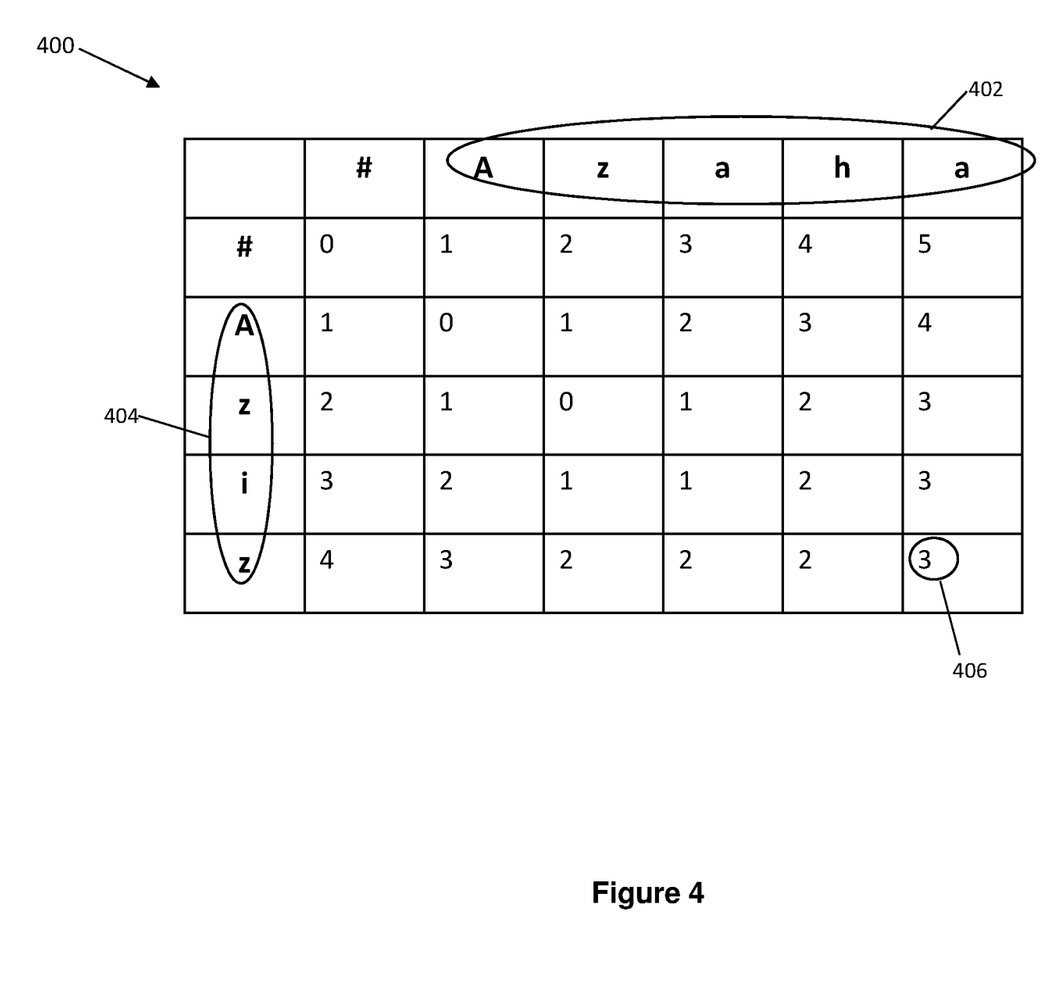
FIG. 4 shows a matrix diagram depicting an embodiment of shortest operation path calculation for correcting an OCR text string into an edit text string. The depicted example is in accordance with Edit Distance technique.

Details of the above steps will be described in the following paragraphs with reference to FIGS. 3, 4 and 5.

Referring back to FIG. 2, the history data library 208 may include an edit pair database 210 which stores edit pairs, and a historical similarity score database 212 which stores historical similarity scores of the edit pairs that are stored in the edit pair database 210. The edit pair database 210 may be configured to calculate frequencies of the edit pairs being stored therein for a certain period of time. For example, the certain period of time can be one month, six months or any other period of time depending on the practical needs.

The frequencies of the edit pairs may then be transmitted 224 from the edit pair database 210 of the history data library 208 to the historical similarity score determination module 214. Upon receiving the frequencies of the edit pairs, the historical similarity score determination module 214 is configured to determine historical similarity scores of the edit pairs based on the frequencies of the edit pairs received from the edit pair database 210 of the history data library 208. The historical similarity scores of the edit pairs are then transmitted 226 to the historical similarity score database 212 of the history data library 208 and stored therein.

Depending on the text similarity quantifications, the text similarity quantification module 206 may then output 228 text similarity quantification results to the output module 216. The text similarity quantification results may include system notification messages that indicate accepting or rejecting the edit text strings or system alerts that indicate potential risks or lock of user accounts.

If the edit text strings are accepted, the text similarity quantification module 206 may add 230 the edit pairs in the shortest operation path having the minimum similarity score into the edit pair database 210 of the history data library 208. In response to the addition of these edit pairs, the history data library 208 may be configured to interact with the historical similarity score determination module 214 to update the historical similarity scores of the edit pairs in the history data library 208.

In some alternative embodiments, the historical similarity score determination module 214 can be implemented as a module comprised within the history data library 208.

In some alternative embodiments, the history data library 208 and/or the historical similarity score determination module 214 can be implemented as modules comprised within the text similarity quantification module 206.

In some alternative embodiments, the edit pair database 210 and the historical similarity score database 212 can be implemented as one database in the history data library 208 that stores both the edit pairs and their corresponding historical similarity scores.

As described above, FIG. 3 depicts a flow chart illustrating a method 300 for quantifying text similarity, according to an embodiment.

At step 302, the device 100 or the text similarity quantification module 206 obtains a plurality of shortest operation paths for correcting an OCR text string with an edit text string. Each of the plurality of shortest operation paths includes one or more edit pairs. Each of the one or more edit pairs denotes an operation performable to a character of the OCR text string during correction by the edit text string.

The plurality of shortest operation paths can be obtained in various manners. In one embodiment, the plurality of shortest operation paths can be obtained by performing an Edit Distance calculation for correcting the OCR text string with the edit text string. In this embodiment, an operation performable to a character of the OCR text string during correction by the edit text string can be one of an insertion operation, a deletion operation, or a substitution operation. It is appreciable to those skilled in the art that other techniques may also be used to obtain the plurality of shortest operation paths. For example, more operations may be defined, such as an operation of exchanging two adjacent characters, which treats transforming a text string "AB" into another text string "BA" as one operation.

In the present embodiment, the edit distance between the OCR text string and the edit text string is derived utilising Edit Distance technique so as to obtain the plurality of shortest operation paths.

Based on Edit Distance technique, for two text strings: String X of length n and String Y of length m, the edit distance between the first i characters of String X and the first j characters of String Y is defined as D (i, j), and the edit distance between String X and String Y is defined as D (n, m).

Initialising D (i, 0)=i and D (0, j)=j,
for each i=1 N and each j=1 M,
D (i, j) can be derived based on the following Equation (1):

$$D(i, j) = \min \begin{cases} D(i-1, j) + 1 \\ D(i, j-1) + 1 \\ D(i-1, j-1) + 1; \text{if } X(i) \neq Y(j) \\ D(i-1, j-1) + 0; \text{if } X(i) = Y(j) \end{cases} \quad \text{Equation (1)}$$

Based on Equation (1), the edit distance D (N, M) between String X and String Y can be accordingly derived. FIG. 4 shows an embodiment illustrating a matrix diagram 400 that derives the edit distance between an OCR text string 402, i.e. "Azaha" and an edit text string 404, i.e. "Aziz", based on Equation (1). The example text strings in this embodiment are related to users' name. It can be appreciated by those skilled in the art that the OCR text string and the edit text string can also be related to addresses, identification numbers, dates of birth, etc.

As shown in cell 406 of the matrix diagram 400, the edit distance is 3 between the OCR text string 402, i.e. "Azaha" and the edit text string 404, i.e. "Aziz". This means that the minimum number of operations required to correcting "Azaha" with "Aziz" is 3.

Based on the edit distance 3, the device 100 or the text similarity quantification module 206 obtains, at step 302, all the possible paths that can transform "Azaha" to "Aziz" within 3 operation steps. These possible paths are considered as a plurality of shortest operation paths.

Figure 5:
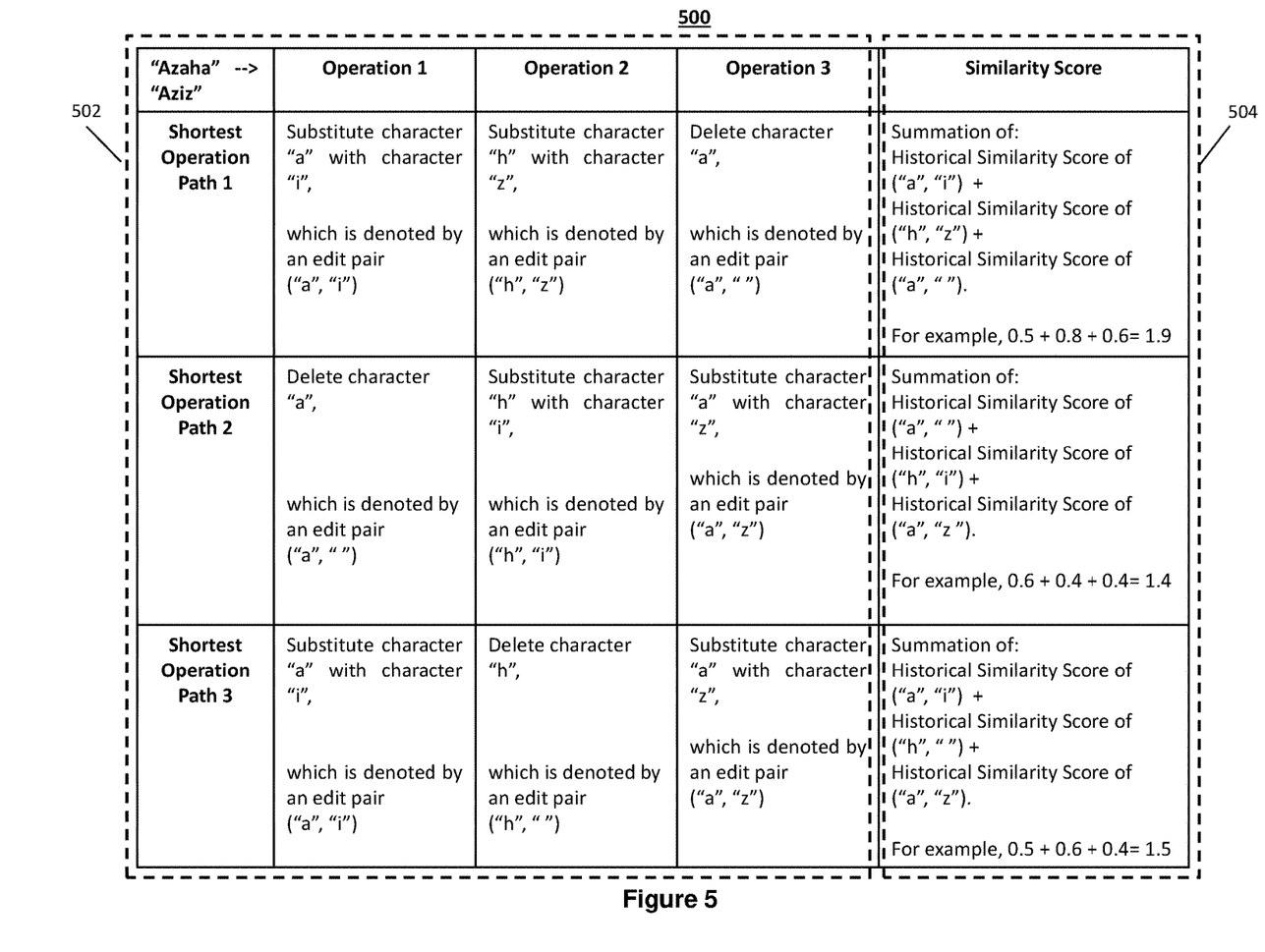
FIG. 5 shows a table diagram depicting an embodiment 502 of obtaining a plurality of shortest operation paths for correcting the OCR text string to edit text string as shown in FIG. 4 and an embodiment 504 of determining a plurality of similarity scores for the plurality of shortest operation paths, according to an implementation of the present disclosure.

An embodiment of step 304 that obtains the plurality of shortest operation paths is illustrated in Table Diagram 500 of FIG. 5. As depicted in sub-table 502, the device 100 or the text similarity quantification module 206 obtains three shortest operation paths for correcting the OCR text string 402, i.e. "Azaha" with the edit text string 404, i.e. "Aziz". The three shortest operation paths include: Shortest operation path 1, Shortest operation path 2, and Shortest operation path 3.

As shown in sub-table 502, Shortest operation path 1 includes three operations, i.e. operation 1 that substitutes character "a" with character "i", operation 2 that substitutes character "h" with character "z", and operation 3 that deletes character "a". Operations 1, 2, 3 in Shortest operation path 1 are denoted as edit pairs ("a", "i"), ("h", "z"), and ("a", " "), respectively.

Shortest operation path 2 includes three operations, i.e. operation 1 that deletes character "a", operation 2 that substitutes character "h" with character "i", and operation 3 that substitutes character "a" with character "z". Operations 1, 2, 3 in Shortest operation path 2 are denoted as edit pairs ("a", " "), ("h", "i"), and ("a", "z"), respectively.

Shortest operation path 3 includes three operations, i.e. operation 1 that substitutes character "a" with character "i", operation 2 that deletes character "h", and operation 3 that substitutes character "a" with character "z". Operations 1, 2, 3 in Shortest operation path 3 are denoted as edit pairs ("a", "i"), ("h", " "), and ("a", "z"), respectively.

As shown in the above embodiment, each of the three shortest operation paths includes three edit pairs. Each of the edit pairs denotes an operation performable to a character of the OCR text string 402, i.e. "Azaha", during correction by the edit text string 404, i.e. "Aziz".

It is appreciable to those skilled in the art that the number of shortest operation paths and the number of edit pairs included in the shortest operation paths may change based on the length of text strings and/or the number of operations required. For example, when correcting an OCR text string "B0B" with an edit text string "BOB", the edit distance is 1, which means that only one operation is required. In such an example, the device 100 or the text similarity quantification module 206 may obtain only one shortest operation path for correcting the OCR text string "B0B" with the edit text string "BOB". The one shortest operation path includes one operation performable to a character of the OCR text string "B0B", i.e. substituting character "0" with character "O". This operation is denoted by an edit pair ("0", "O").

At step 304, the device 100 or the text similarity quantification module 206 determines a plurality of similarity scores for the plurality of shortest operation paths. Each of the plurality of similarity scores corresponds to one of the plurality of shortest operation paths as determined in step 302. Each of the plurality of similarity scores is determined by summing historical similarity scores of the one or more edit pairs of each of the plurality of shortest operation paths.

An embodiment of step 304 is depicted in sub-table 504 of FIG. 5. As shown in sub-table 504, the device 100 or the text similarity quantification module 206 determines three similarity scores corresponding to the three shortest operation paths, respectively. That is, for each of Shortest operation path 1, Shortest operation path 2, and Shortest operation path 3, a similarity score is determined. In the present embodiment, the device 100 or the text similarity quantification module 206 determines each of the three similarity scores by summing historical similarity scores of the edit pairs of each of the shortest operation paths.

For example, for Shortest operation path 1, the device 100 or the text similarity quantification module 206 determines a similarity score by summing historical similarity scores of the corresponding edit pairs ("a", "i"), ("h", "z"), and ("a", " ").

For Shortest operation path 2, the device 100 or the text similarity quantification module 206 determines a similarity score by summing historical similarity scores of the corresponding edit pairs ("a", " "), ("h", "i"), and ("a", "z").

For Shortest operation path 3, the device 100 or the text similarity quantification module 206 determines a similarity score by summing historical similarity scores of the corresponding edit pairs ("a", "i"), ("h", " "), and ("a", "z").

In an example, when summing the historical similarity scores of the edit pairs at step 403, the device 100 or the text similarity quantification module 206 may retrieve 222 the historical similarity scores of the edit pairs from the history data library 208, as depicted in FIG. 2.

In another example, when summing the historical similarity scores of the edit pairs at step 403, the device 100 or the text similarity quantification module 206 may retrieve the historical similarity scores of the edit pairs from a history database. The history database may be implemented by the memory module 104 that is comprised within the device 100 or the text similarity quantification module 206.

In yet another example, the history data library 208 may be implemented as a module comprised within the device 100 or the text similarity quantification module 206. In this example, when summing the historical similarity scores of the edit pairs at step 403, the device 100 or the text similarity quantification module 206 may retrieve the historical similarity scores of the edit pairs from the module comprised within.

In some embodiments, the preparation of the historical similarity scores of the edit pairs may be conducted by the history data library 208, the memory module 104, or other modules comprised the device 100 or the text similarity quantification module 206.

The history data library 208, the memory module 104, or other modules comprised the device 100 or the text similarity quantification module 206 may include an edit pair database 210 and a historical similarity score database 212 as depicted in FIG. 2. In an embodiment of preparing the historical similarity scores, the history data library 208, the memory module 104, or other modules comprised the device 100 or the text similarity quantification module 206 is configured to collect all kinds of edit pairs that are attempted by users for a pre-determined period of time. For example, the all kinds of edit pairs may be collected by the device 100 or the text similarity quantification device 206 in response to receiving OCR text strings of digital images captured by the OCR device/module and receiving edit text strings captured by the input device/module corresponding to the OCR text strings. These edit pairs may be initialised to each equal a value of 1.0 and be stored into edit pair database 210.

The pre-determined period of time may be one month, six months or any other period of time depending on the practical needs. During the pre-determined period of time, frequencies of the edit pairs being stored in the edit pair database 210 can be calculated. The more often the edit pairs being stored, the more times that the operations denoted by the edit pairs have happened, and the more likely that the operations denoted by the edit pairs may happen again. In this regard, the frequencies of the edit pairs being stored in the edit pair database 210 are utilised to determine historical similarity scores of the edit pairs that are stored in the edit pair database 210 of the history data library 208, the memory module 104, or other modules comprised in the device 100 or the text similarity quantification module 206.

In some embodiments, the frequencies of the edit pairs may be provided to a historical similarity score determination module 214 for determining historical similarity scores of the edit pairs that are stored in the edit pair database 210 of the history data library 208, the memory module 104, or other modules comprised in the device 100 or the text similarity quantification module 206. The historical similarity score determination module 214 may be a stand-alone module, as depicted in FIG. 2, communicable to the history data library 208, the memory module 104, or other modules comprised the device 100 or the text similarity quantification module 206. Alternatively, the historical similarity score determination module 214 may be implemented as a module comprised within the history data library 208, the memory module 104, or the other modules comprised the device 100 or the text similarity quantification module 206.

In some embodiments, the historical similarity score determination module 214 may be configured to perform a log frequency calculation for each of the edit pairs in the edit pair database 210 of the history data library 208, the memory module 104, or other modules comprised in the device 100 or the text similarity quantification module 206. The log frequency calculations of the edit pairs in the edit pair database 210 may then be normalised by the historical similarity score determination module 214 to a range of 0.0 to 1.0. The normalised log frequency calculations are considered as historical similarity scores of the edit pairs in the edit pair database 210 of the history data library 208, the memory module 104, or other modules comprised in the device 100 or the text similarity quantification module 206. In some embodiments, the historical similarity scores of the edit pairs may be transmitted from historical similarity score determination module 214 to the historical similarity score database 212 of the history data library 208, the memory module 104, or other modules comprised the device 100 or the text similarity quantification module 206, and stored therein. In some embodiments, the similarity score determination module 214 and the historical similarity score database 212 may be implemented as a single module.

In an embodiment, the log frequency calculation can be divided into two steps. First, for every edit pair p, a log (frequency of p) is calculated. Subsequently, for every score derived from the log (frequency of p) calculation, the score is normalised to a range from 0.0 to 1.0, which means that a maximum score of the log (frequency of p) calculation is mapped to 0.0, and a minimum score of 1 the log (frequency of p) calculation is mapped to 1.0. In this manner, the historical similarity score for every edit pair is determined, for example, according to the following Equation (2):

$$\text{Score}(p)=1.0-(\log(p)-\min\text{score})/(\max\text{score}-\min\text{score}) \quad \text{Equation(2)}$$

It is appreciable to those skilled in the art that the historical similarity scores of the edit pairs may be determined in other manners in light of the present disclosure, for example, without a log frequency calculation.

Figure 6:
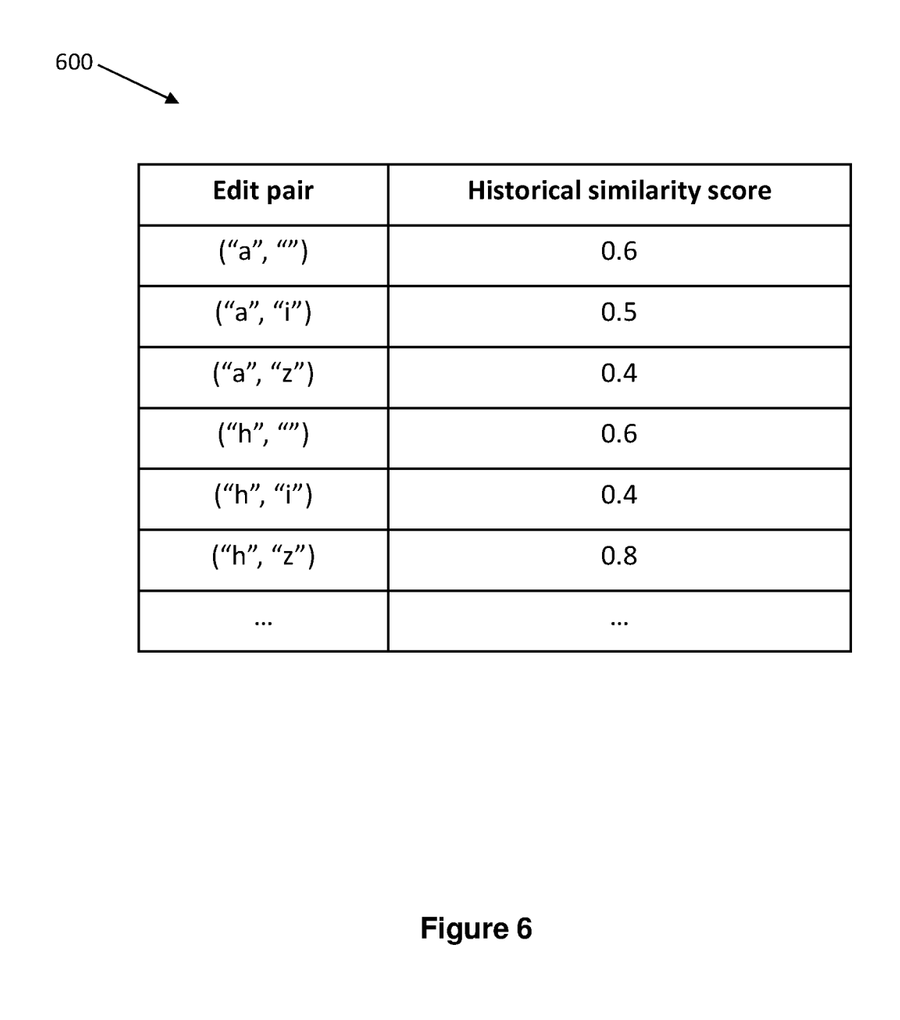
FIG. 6 is a table diagram showing historical similarity scores of edit pairs according to an embodiment.

An embodiment is shown in a table diagram 600 of FIG. 6 to illustrate the historical similarity scores of the edit pairs that are stored in the history data library 208, the memory module 104, or other modules comprised the device 100 or the text similarity quantification module 206.

In the embodiment shown in the table diagram 600, each of the edit pairs of Shortest operation path 1, Shortest operation path 2, and Shortest operation path 3 may have a corresponding historical similarity score. For example, the edit pairs ("a", " "), ("a", "i"), ("a", "z"), ("h", " "), ("h", "i") and ("h", "z") may each have a historical similarity score of 0.5, 0.5, 0.4, 0.6, 0.4, and 0.8, respectively. The smaller the historical similarity score is, the more times that the operation denoted by the edit pair have happened, and the more likely and more reasonable that the operation denoted by the edit pair may happen again.

If no historical similarity score can be found for a certain edit pair, it may mean that the operation denoted by the certain edit pair has never happened before the instant attempt by the user. In this regard, the history data library 208, the memory module 104, or other modules comprised the device 100 or the text similarity quantification module 206 may return a value of 1.0 to the device 100 or the text similarity quantification module 206 as the historical similarity score for that certain edit pair.

Based on the examples of table diagram 600 and in accordance with an embodiment shown in sub-table 504 of FIG. 5, the similarity score of the Shortest operation path 1 can be determined as 0.5+0.8+0.6, which equals 1.9. The similarity score of the Shortest operation path 2 can be determined as 0.6+0.4+0.4, which equals 1.4. Similarly, the similarity score of the Shortest operation path 3 can be determined as 0.5+0.6+0.4, which equals 1.5.

The table diagram 600 may include historical similarity scores of other edit pairs. For the sake of simplicity, those historical similarity scores are not shown in FIG. 6.

It is appreciable to those skilled in the art that the historical similarity scores of the edit pairs may be stored in other formats in the history data library 208, the memory module 104, or other modules comprised the device 100 or the text similarity quantification module 206.

At step 306, the device 100 or the text similarity quantification module 206 selects a minimum one of the plurality of similarity scores that are determined for the plurality of shortest operation paths. The selected minimum similarity score is used to quantify text similarity between the OCR text string and the edit text string.

In some examples, if the minimum one of the plurality of similarity scores is below a predetermined threshold, the device 100 or the text similarity quantification module 206 may correct the OCR text string with the edit text string. The predetermined threshold may be determined by certain requirements of different applications. For example, we can set it to 1.5 as exemplified in the present embodiments, or 0.5 which means that it requires that the total number of operations to be small enough, and the operations to be of high frequencies.

In an embodiment, for the three similarity scores of the three shortest operation paths determined as shown in sub-table 504 of FIG. 5, the device 100 or the text similarity quantification module 206 may select the minimum similarity score 1.4 among the three similarity scores 1.9, 1.4 and 1.5 as a quantification of the text similarity between the OCR text string 402, i.e. "Azaha", and the edit text string 404, i.e. "Aziz". If the predetermined threshold is 1.5, the quantification of the text similarity in this embodiment is below the predetermined threshold, thus the device 100 or the text similarity quantification module 206 may correct the OCR text string "Azaha" with the edit text string "Aziz".

In this embodiment, the device 100 or the text similarity quantification module 206 may further add the edit pairs in the shortest operation path having the minimum similarity score, i.e. the edit pairs ("a", " "), ("h", "i") and ("a", "z") in the Shortest operation path 2 that has the minimum similarity score 1.4, into the edit pair database 210 of the history data library 208, the memory module 104, or other modules comprised in the device 100 or the text similarity quantification module 206. In addition, the device 100 or the text similarity quantification module 206 may update the historical similarity scores for the edit pairs in the history data library. The updating of the historical similarity scores for the edit pairs in the history data library includes one or more of the following steps:

calculating frequencies of edit pairs in the edit pair database 210 of the history data library 208, the memory module 104, or other modules comprised in the device 100 or the text similarity quantification module 206 corresponding to the edit pairs in the shortest operation path having the minimum similarity score; and determining historical similarity scores for the edit pairs in the edit pair database 210 of the history data library 208, the memory module 104, or other modules comprised in the device 100 or the text similarity quantification module 206 corresponding to the edit pairs in the shortest operation path having the minimum similarity score by: performing a log frequency calculation for each of the edit pairs in the history data library 208, the memory module 104, or other modules comprised in the device 100 or the text similarity quantification module 206 corresponding to the edit pairs in the shortest operation path having the minimum similarity score and normalising the log frequency calculations to a range of 0.0 to 1.0.

For example, in the present embodiment, the device 100 or the text similarity quantification module 206 may add the edit pairs ("a", " "), ("h", "i") and ("a", "z") in the Shortest operation path 2 that has the minimum similarity score 1.4 to the edit pair database 210 of the history data library 208, the memory module 104, or other modules comprised in the device 100 or the text similarity quantification module 206, and update the historical similarity scores for the edit pairs ("a", " "), ("h", "i") and ("a", "z") in the edit pair database 210 of the history data library 208, the memory module 104, or other modules comprised in the device 100 or the text similarity quantification module 206 with the following steps: calculating frequencies of the edit pairs ("a", " "), ("h", "i") and ("a", "z") and determining historical similarity scores for the edit pairs ("a", " "), ("h", "i") and ("a", "z") by performing a log frequency calculation for each of the edit pairs ("a", " "), ("h", "i") and ("a", "z") and normalising the log frequency calculations to a range of 0.0 to 1.0.

In some examples, if the minimum one of the plurality of similarity scores is above the predetermined threshold, the device 100 or the text similarity quantification module 206 may maintain the OCR text string.

Alternatively or additionally, the device 100 or the text similarity quantification module 206 may determine a text similarity quantification result and output the text similarity quantification result to the output module 216. The text similarity quantification result may include system notification messages that indicate "accept" (if the minimum one of the plurality of similarity scores is below the predetermined threshold) or "reject" (if the minimum one of the plurality of similarity scores is above the predetermined threshold) to the edit text strings or system alerts that indicate potential risks or lock of user accounts.

Figure 7:
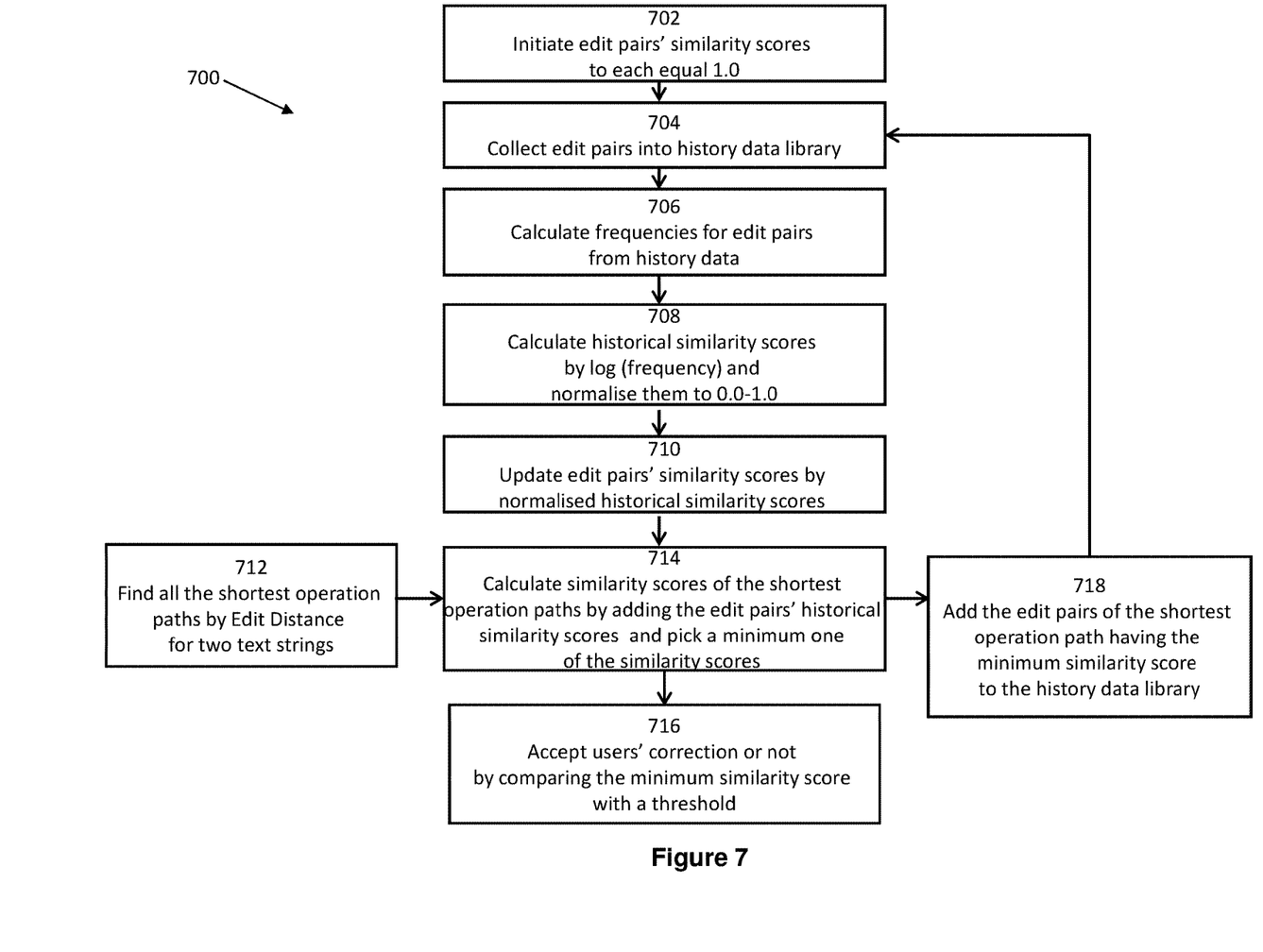
FIG. 7 is a flow chart illustrating a method for quantifying text similarity according to another embodiment.

FIG. 7 is a flow chart illustrating a method 700 for quantifying text similarity according to another embodiment.

At step 702, edit pairs' similarity scores are initialised by the history data library 208, the memory module 104, or other modules comprised in the device 100 or the text similarity quantification module 206 to each equal 1.0.

At step 704, edit pairs are collected into the history data library 208, the memory module 104, or other modules comprised in the device 100 or the text similarity quantification module 206.

At step 706, frequencies of the edit pairs in the history data library 208, the memory module 104, or other modules comprised in the device 100 or the text similarity quantification module 206 are calculated based on the collected data.

At step 708, historical similarity scores of the edit pairs in the history data library 208, the memory module 104, or other modules comprised in the device 100 or the text similarity quantification module 206 are calculated by log (frequency) calculations and normalised to a range of 0.0-1.0.

At step 710, the edit pairs' similarity scores are updated as the historical similarity scores.

At step 712, the device 100 or the text similarity quantification module 206 receives an OCR text string and an edit text string when a user attempts to make a correction, and find all the shortest operation paths by Edit Distance technique for the two text strings.

At step 714, the device 100 or the text similarity quantification module 206 calculates similarity scores of the shortest operation paths by adding the edit pairs' historical similarity scores and pick a minimum one of the similarity scores to quantify the text similarity between the OCR text string and the edit text string.

At step 716, the device 100 or the text similarity quantification module 206 decides to accept the user's correction by comparing the minimum one of the similarity scores with a pre-determined threshold.

At step 718, if the minimum one of the similarity scores is below the pre-determined threshold, the user's correction is accepted by the device 100 or the text similarity quantification module 206. The device 100 or the text similarity quantification module 206 further adds the edit pairs of the shortest operation path having the minimum similarity score to the history data library 208, the memory module 104, or other modules comprised in the device 100 or the text similarity quantification module 206.

Figure 8:
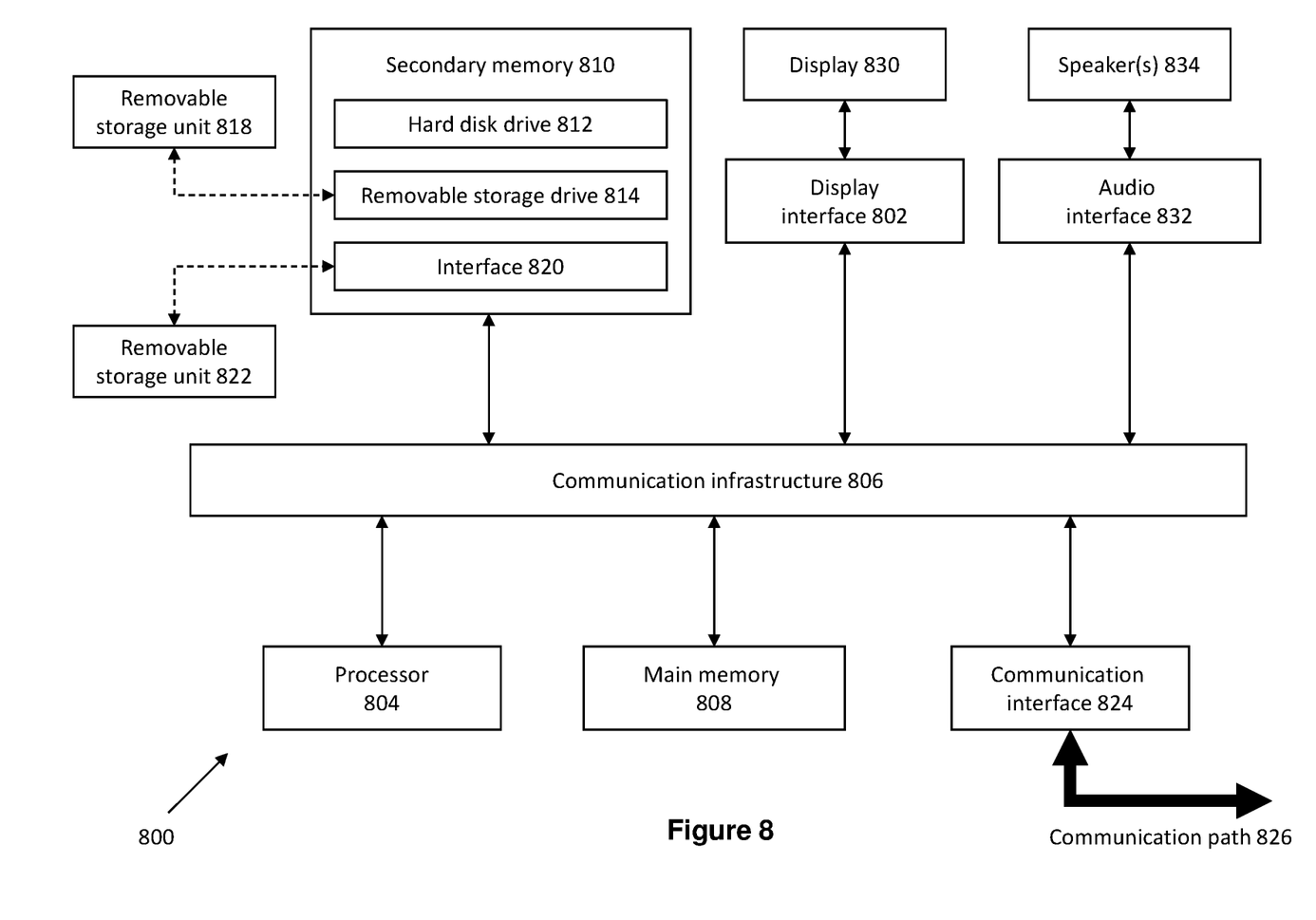
FIG. 8 shows a block diagram of a computer system suitable for use as the example device shown in FIG. 1 and in the example system as shown in FIG. 2 in executing at least some steps of the method for quantifying text similarity in accordance with the embodiments shown in FIGS. 3 to 7.

FIG. 8 shows a block diagram of a computer system suitable for use as the device 100 or the text similarity quantification module 206 shown in FIGS. 1 and 2, or the system 200 as shown in FIG. 2 in executing at least some steps of the method for quantifying text similarity in accordance with the embodiments shown in FIGS. 3 to 7.

The following description of the computer system/computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a hard disk drive 812 and/or a removable storage drive 814, which may include a magnetic tape drive, an optical disk drive, or the like. The removable storage drive 814 reads from and/or writes to a removable storage unit 818 in a well-known manner. The removable storage unit 818 may include a magnetic tape, optical disk, or the like, which is read by and written to by removable storage drive 814. As will be appreciated by persons skilled in the relevant art(s), the removable storage unit 818 includes a computer readable storage medium having stored therein computer executable program code instructions and/or data.

In an alternative implementation, the secondary memory 810 may additionally or alternatively include other similar means for allowing computer programs or other instructions to be loaded into the computing device 800. Such means can include, for example, a removable storage unit 822 and an interface 820. Examples of a removable storage unit 822 and interface 820 include a removable memory chip (such as an EPROM or PROM) and associated socket, and other removable storage units 822 and interfaces 820 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments, the communication interface 824 permits data to be transferred between the computing device 800 and a data communication network, such as a public data or private data communication network. The communication interface 824 may be used to exchange data between different computing devices 800 which such computing devices 800 form part an interconnected computer network. Examples of a communication interface 824 can include a modem, a network interface (such as an Ethernet card), a communication port, an antenna with associated circuitry and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

Optionally, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage unit 818, removable storage unit 822, a hard disk installed in hard disk drive 812, or a carrier wave carrying software over communication path 826 (wireless link or cable) to communication interface 824. Computer readable storage media refers to any non-transitory tangible storage medium that provides recorded instructions and/or data to the computing device 800 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets including e-mail transmissions and information recorded on Websites and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the hard disk drive 812, or the interface 820. Alternatively, the computer program product may be downloaded to the computer system 800 over the communications path 826. The software, when executed by the processor 804, causes the computing device 800 to perform functions of embodiments described herein.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

According to one embodiment, there is provided a device for quantifying text similarity. The device includes a processor (such as the processor 404) and a memory (such as the secondary memory 410) including computer program code. The memory and the computer program code are configured to, with the processor, cause the device at least to obtain a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string; determine a plurality of similarity scores for the plurality of shortest operation paths, wherein each of the plurality of similarity scores is determined by summing historical similarity scores of the one or more edit pairs of each of the plurality of shortest operation paths; and select a minimum one of the plurality of similarity scores to quantify text similarity between the OCR text string and the edit text string.

The techniques described in this specification produce one or more technical effects. In particular, the present disclosure evaluates not only the minimum number of operations required to transform one text string into the other, but also quantifies relevance between the two text strings, i.e. how likely those operations may happen between the two text strings. Specifically, the present disclosure utilises frequencies of edit pairs to determine the historical similarity scores of the edit pairs and considers that the more often the edit pairs being stored, the more times that the operations denoted by the edit pairs have happened, and the more likely that the operations denoted by the edit pairs may happen again. In this regard, frequencies of history changes between pairs of characters are taken into consideration in the present disclosure to quantify future changes between the same pairs of characters. That is, in the present embodiments, historical frequencies of edit pairs are used to model their respective visual similarities, which produces a satisfying accuracy on auto-verification of manual corrections to OCR texts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A computer-implemented device for quantifying text similarity, the device comprising:
   at least one processor; and
   a memory including computer program code for execution by the at least one processor,
   the computer program code configured to cause the at least one processor to:
   obtain a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string;
   determine a plurality of similarity scores, each of the plurality of similarity scores corresponding to one of the plurality of shortest operation paths, wherein each of the plurality of similarity scores is determined by summing historical similarity scores of the one or more edit pairs of each of the plurality of shortest operation paths, wherein when summing the historical similarity scores of the one or more edit pairs, the computer program code further instruct the device to:
   retrieve the historical similarity scores of the one or more edit pairs from a history data library;
   collect edit pairs into the history data library;
   calculate frequencies of the edit pairs in the history data library; and
   determine the historical similarity scores for the edit pairs in the history data library, wherein when determining the historical similarity scores, the computer program code further instruct the device to:
   perform a log frequency calculation for each of the edit pairs in the history data library; and
   normalize the log frequency calculations to a range of 0.0 to 1.0; and select a minimum one of the plurality of similarity scores to quantify text similarity between the OCR text string and the edit text string.

2. The computer-implemented device of claim 1, wherein the computer program code is further configured to cause the at least one processor to:
   add the edit pairs in the shortest operation path having the minimum similarity score into the history data library; and
   update the historical similarity scores for the edit pairs in the history data library, wherein when updating the historical similarity scores, the computer-implemented device is configured to:
      calculate frequencies of edit pairs in the history data library corresponding to the edit pairs in the shortest operation path having the minimum similarity score; and
      determine historical similarity scores for the edit pairs in the history data library corresponding to the edit pairs in the shortest operation path having the minimum similarity score by: performing a log frequency calculation for each of the edit pairs in the history data library corresponding to the edit pairs in the shortest operation path having the minimum similarity score and normalizing the log frequency calculations to a range of 0.0 to 1.0.

3. The computer-implemented device of claim 1, wherein, when obtaining the plurality of shortest operation paths, the computer program code is further configured to cause the at least one processor to:
   perform an Edit Distance calculation for correcting the OCR text string with the edit text string, wherein the operation performable to a character of the OCR text string during correction by the edit text string is one of an insertion operation, a deletion operation, or a substitution operation.

4. The computer-implemented device of claim 1, wherein the computer program code is further configured to cause the at least one processor to:
   if the minimum one of the plurality of similarity scores is below a predetermined threshold, correct the OCR text string with the edit text string.

5. The computer-implemented device of claim 4, wherein the computer program code is further configured to cause the at least one processor to:
   if the minimum one of the plurality of similarity scores is above the predetermined threshold, maintain the OCR text string.

6. The computer-implemented device of claim 1, wherein the computer program code is further configured to cause the at least one processor to:
   scan a digital image to capture the OCR text string, and capture the edit text string.

7. A computer-implemented method for quantifying text similarity, comprising:
   obtaining a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string;
   determining a plurality of similarity scores for the plurality of shortest operation paths, wherein each of the plurality of similarity scores is determined by summing historical similarity scores of the one or more edit pairs of each of the plurality of shortest operation paths, wherein summing the historical similarity scores of the one or more edit pairs comprises retrieving the historical similarity scores of the one or more edit pairs from a history data library;
   collecting edit pairs into the history data library;
   calculating frequencies of the edit pairs in the history data library; and
   determining the historical similarity scores for the edit pairs in the history data library, wherein calculating the historical similarity scores comprises:
      performing a log frequency calculation for each of the edit pairs in the history data library; and
      normalizing the log frequency calculations to a range of 0.0 to 1.0; and
   selecting a minimum one of the plurality of similarity scores to quantify text similarity between the OCR text string and the edit text string.

8. The computer-implemented method of claim 7, further comprising:
   adding the edit pairs in the shortest operation path having the minimum similarity score into the history data library; and
   updating the historical similarity scores for the edit pairs in the history data library, wherein updating the historical similarity scores comprises:
      calculating frequencies of edit pairs in the history data library corresponding to the edit pairs in the shortest operation path having the minimum similarity score; and
      determining historical similarity scores for the edit pairs in the history data library corresponding to the edit pairs in the shortest operation path having the minimum similarity score by: performing a log frequency calculation for each of the edit pairs in the history data library corresponding to the edit pairs in the shortest operation path having the minimum similarity score and normalizing the log frequency calculations to a range of 0.0 to 1.0.

9. The computer-implemented method of claim 7, wherein the step of obtaining the plurality of shortest operation paths comprises performing an Edit Distance calculation for correcting the OCR text string with the edit text string, and wherein the operation performable to a character of the OCR text string during correction by the edit text string is one of an insertion operation, a deletion operation, or a substitution operation.

10. The computer-implemented method of claim 7, further comprising:
    if the minimum one of the similarity scores is below a predetermined threshold, correcting the OCR text string with the edit text string.

11. The computer-implemented method of claim 10, further comprising:
    if the minimum one of the similarity scores is above the predetermined threshold, maintaining the OCR text string.

12. The computer-implemented method of claim 7, further comprising:
    scanning a digital image to capture the OCR text string, and
    capturing the edit text string.

13. A non-transitory, computer-readable medium storing one or more instructions executable by a computer system to perform one or more operations to index blockchain data for storage, comprising:

obtaining a plurality of shortest operation paths for correcting an optical correction recognition (OCR) text string with an edit text string, wherein each of the plurality of shortest operation paths includes one or more edit pairs, each of the one or more edit pairs denoting an operation performable to a character of the OCR text string during correction by the edit text string;

determining a plurality of similarity scores for the plurality of shortest operation paths, wherein each of the plurality of similarity scores is determined by summing historical similarity scores of the one or more edit pairs of each of the plurality of shortest operation paths, wherein summing the historical similarity scores of the one or more edit pairs comprises retrieving the historical similarity scores of the one or more edit pairs from a history data library;

collecting edit pairs into the history data library;

calculating frequencies of the edit pairs in the history data library; and determining the historical similarity scores for the edit pairs in the history data library, wherein calculating the historical similarity scores comprises:
- performing a log frequency calculation for each of the edit pairs in the history data library; and
- normalizing the log frequency calculations to a range of 0.0 to 1.0; and selecting a minimum one of the plurality of similarity scores to quantify text similarity between the OCR text string and the edit text string.

14. The non-transitory, computer-readable medium of claim 13, further comprising one or more instructions for:
adding the edit pairs in the shortest operation path having the minimum similarity score into the history data library; and
updating the historical similarity scores for the edit pairs in the history data library, wherein updating the historical similarity scores comprises:
calculating frequencies of edit pairs in the history data library corresponding to the edit pairs in the shortest operation path having the minimum similarity score; and
determining historical similarity scores for the edit pairs in the history data library corresponding to the edit pairs in the shortest operation path having the minimum similarity score by: performing a log frequency calculation for each of the edit pairs in the history data library corresponding to the edit pairs in the shortest operation path having the minimum similarity score and normalizing the log frequency calculations to a range of 0.0 to 1.0.

15. The non-transitory, computer-readable medium of claim 13, wherein the step of obtaining the plurality of shortest operation paths comprises performing an Edit Distance calculation for correcting the OCR text string with the edit text string, and wherein the operation performable to a character of the OCR text string during correction by the edit text string is one of an insertion operation, a deletion operation, or a substitution operation.

16. The non-transitory, computer-readable medium of claim 13, further comprising one or more instructions for:
if the minimum one of the similarity scores is below a predetermined threshold, correcting the OCR text string with the edit text string.

17. The non-transitory, computer-readable medium of claim 16, further comprising one or more instructions for:
if the minimum one of the similarity scores is above the predetermined threshold, maintaining the OCR text string.

18. The non-transitory, computer-readable medium of claim 13, further comprising one or more instructions for:
scanning a digital image to capture the OCR text string, and
capturing the edit text string.

* * * * *